(12) United States Patent
Marchon et al.

(10) Patent No.: US 8,649,119 B2
(45) Date of Patent: Feb. 11, 2014

(54) MEASURING VARIATIONS IN HEAD-DISK CLEARANCE IN A HARD DISK DRIVE

(75) Inventors: Bruno Marchon, Palo Alto, CA (US); Kazuhiro Saito, San Jose, CA (US); Roger Wood, Gilroy, CA (US); Bruce Wilson, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 248 days.

(21) Appl. No.: 13/211,593

(22) Filed: Aug. 17, 2011

(65) Prior Publication Data
US 2013/0044387 A1    Feb. 21, 2013

(51) Int. Cl.
*G11B 27/36*    (2006.01)
*G11B 21/02*    (2006.01)

(52) U.S. Cl.
USPC .............................................. 360/31; 360/75

(58) Field of Classification Search
None
See application file for complete search history.

(56) References Cited

U.S. PATENT DOCUMENTS

| | | | |
|---|---|---|---|
| 4,777,544 A * | 10/1988 | Brown et al. ................... | 360/75 |
| 5,130,866 A * | 7/1992 | Klaassen et al. ................ | 360/75 |
| 6,249,393 B1 | 6/2001 | Billings et al. | |
| 6,437,930 B1 * | 8/2002 | Liu et al. ........................ | 360/25 |
| 7,362,534 B1 * | 4/2008 | Schreck et al. ................. | 360/75 |
| 7,542,227 B2 * | 6/2009 | Che et al. ........................ | 360/75 |
| 7,626,779 B2 | 12/2009 | Kuwahara | |
| 7,715,135 B1 | 5/2010 | Sutardja et al. | |
| 7,830,634 B2 | 11/2010 | Chen et al. | |
| 7,839,595 B1 | 11/2010 | Chue et al. | |
| 7,986,487 B1 * | 7/2011 | Madden et al. .................. | 360/75 |
| 2004/0233561 A1 * | 11/2004 | Yeh et al. ......................... | 360/31 |
| 2007/0268615 A1 * | 11/2007 | McFadyen et al. .............. | 360/75 |
| 2009/0195912 A1 | 8/2009 | Sato | |
| 2009/0201598 A1 * | 8/2009 | Masuda et al. ................... | 360/31 |
| 2010/0128399 A1 | 5/2010 | Che et al. | |
| 2010/0208387 A1 | 8/2010 | Ehrlich | |
| 2011/0007416 A1 * | 1/2011 | Kuramoto ........................ | 360/75 |
| 2012/0014011 A1 * | 1/2012 | Wilson ............................. | 360/39 |
| 2012/0087035 A1 * | 4/2012 | Graef ............................... | 360/75 |
| 2013/0044387 A1 * | 2/2013 | Marchon et al. ................. | 360/31 |

OTHER PUBLICATIONS

Schardt, B et al., "Fly-Height Measurement While Seeking in Hard Drives", Adv. Technol. Group, Maxtor Corp., V.J. Novotny, Magnetic Recording Drive Dynamics During Seeking and Parking, *Digests of intermag '97* (35th Intermag Conf.). Contributed Paper, http://ieeexplore.ieeeeorg/_stamp/stamp.jsp?arnumber=737112, AR-06.
Boettcher, Uwe et al., "Servo Signal Data Processing for Flying Height Control in Hard Disk Drives", *UCSD, Center for Magnetic Recording Research, CMRR Report No. 33, Winter 2010.*

* cited by examiner

*Primary Examiner* — Peter Vincent Agustin (57) ABSTRACT

Methods and systems for measuring variations in head-disk clearance in a hard disk drive. User generated data is randomly selected at a controller of the hard disk drive wherein the user generated data is stored on a disk associated with the hard disk drive. A reference point associated with the user generated data is stored on a storage medium associated with the hard disk drive. The user generated data is read at the controller. The user generated data is analyzed with the reference point using more than two frequencies, at the controller, to obtain a variation in measurement of the head-disk clearance.

20 Claims, 4 Drawing Sheets

MEASURING VARIATIONS IN HEAD-DISK CLEARANCE IN A HARD DISK DRIVE

BACKGROUND ART

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

In an HDD, there may be a read and write head that flies over a disk with a clearance. Such clearance may fluctuate causing inconsistencies in HDD operations especially when the read and write head contacts the magnetic disk. To compensate, control systems in the HDD may measure changes in the clearance between the disk and the read and write head.

DESCRIPTION OF EMBODIMENTS

Reference will now be made in detail to various embodiments of the present invention. While the invention will be described in conjunction with these embodiments, it should be understood that the described embodiments are not intended to limit the invention to these embodiments. On the contrary, the invention is intended to cover alternatives, modifications and equivalents, which may be included within the spirit and scope of the invention as described in the various embodiments and as defined by the appended claims.

Furthermore, in the following description of embodiments, numerous specific details are set forth in order to provide a thorough understanding of various embodiments of the present invention. However, it will be recognized by one of ordinary skill in the art that embodiments of the present invention may be practiced without these specific details. In other instances, well known methods, procedures, components, and circuits have not been described in detail as not to unnecessarily obscure aspects of embodiments of the present invention.

Overview of Discussion

The discussion will begin with a brief overview of embodiments of the present invention. The discussion will then focus on a hard disk drive (HDD) and components connected therewith. The discussion will then focus on embodiments of measuring variations in head-disk clearance in an HDD.

In the routine use of a HDD, a read and write head may fly over a disk with a clearance, or a head-disk clearance. The read and write head receives a signal during read operations of the disk. Such a signal may comprise a spectrum of frequencies. The term head-disk clearance may refer to spacing between the read and write head and the surface of the disk in a HDD. The spacing or clearance may be referred to head-disk clearance, spacing, clearance, slider-disk clearance, etc.

The head-disk clearance may fluctuate and cause inconsistencies in the HDD operation. If the clearance drifts higher then signal integrity is deteriorated. If clearance is too low then mechanical interactions start to increase such as the read and write head contacting the surface of the disk. This may possibly lead to loss of control of the clearance and reader degradation. Techniques have been devised to monitor the clearance or fly height of the read and write head to control the clearance. Thermal fly height control (TFC) is a technique for controlling the clearance but requires measurements of the clearance to operate effectively. The present technology measures variations in the clearance of the read and write head over the surface of the disk during operations of a HDD.

One solution measuring variations in the head-disk clearance is to write a specific pattern of 0's and 1's to a dedicated track on the disk. A signal amplitude associated with the specific pattern is then measured at two different frequencies. For example, one frequency may be three times the other. If T corresponds to the read clock period, schemes that are used involve 1T/3T or 2T/6T pairs for instance. The data the related to the signal amplitude at the two frequencies is analyzed using the Wallace equation to measure variations in the head disk clearance. The Wallace equation is demonstrated in Equation 1 where l is the readback signal, f is the frequency, a(f) is the power spectrum of data, and h is head media spacing. This technique may be referred to as the Wallace method, technique or approximation.

$$l \sim a(f) \cdot \exp^{-2\pi \cdot f \cdot h} \quad \text{Equation 1}$$

The drawback of the Wallace technique is two-fold. First it is not very accurate and usually requires at least one full dedicated track of data, impacting drive capacity. The Wallace equation begins to lose accuracy at high frequencies and also at low frequencies for perpendicular recording (PMR) systems. Therefore the Wallace method may only be effective for frequencies in the range 2T-5T. Second, the Wallace method necessitates seeking to that reference track every time TFC calibration is needed, which has a performance impact especially for controlling TFC in real time (e.g. at least once every second). One embodiment of the present technology does not employ the Wallace equation or the Wallace technique.

In operation the HDD may have at least one disk that has user data written to the disk. In one embodiment, a controller in the HDD randomly selects user data and stores a reference point in a storage medium associated with the HDD. The HDD operates to read user data via a read head which receives an electronic signal from the at least one disk. The signal has an amplitude which is measured at different frequencies. Such measurements are stored as the described reference point. It should be appreciated that the reference point may represent several data points related to the described measurements. Such measurements made be stored on a memory associated with the HDD. The controller may also store location data related to where the randomly selected user data is stored on the disk. In one embodiment, this location data is also associated with the reference point.

The controller then reads the randomly selected user data and analyzes it with the stored reference point. For example, the controller may read the randomly selected user data at a time subsequent to when the reference point was stored. This essentially is a second reading of the randomly selected user data and also measures the amplitude of the signal received at the read head from the disk at a variety of frequencies. Thus, the controller has two sets of data related to amplitude of a signal received from the disk. The analysis may analyze the differences in the two sets of data using mathematical operations. Such analysis results in a measurement of a variation in the clearance of the read and write head over the disk.

The signal received by the read head from the disk may be represented mathematically using sinusoidal waves. The process of representing the signal as a combination of sinusoidal waves may be referred to as Fourier analysis. Each of the sine waves has an associated frequency. A power spectrum is related to the signal's power at different frequencies.

In one embodiment, the user data is analyzed using more than two frequencies associated with a signal related to the user data. For example, the controller may store reference points or user data with all associated frequencies, but only analyze using a discrete number of frequencies or all of the frequencies. In one embodiment, the described mathematical operation comprises a Fourier transform operation to obtain the variations in the clearance. A portion of the power spectrum may then be analyzed using a theoretical expression in order to extract clearance or spacing changes. In one embodiment, the variations in the clearance are used to control the clearance during operations of the HDD. Thus the present technology may be employed at both high and low frequencies, for perpendicular recording, does not require a specific pattern of data be written to a dedicated track of the disk, and does not require seeking to a dedicated track for obtaining a measurement in variations of clearance.

Within the power spectrum, a range of frequencies may exhibit linear properties which may be useful to the present technology. For example, at high frequencies and low frequencies the data may be nonlinear. In one embodiment, the present technology may operate to identify the portion of the power spectrum in which the data exhibits linear properties and use the data related to such a portion of the power spectrum to perform linear regression techniques to measure variations in the head-disk clearance.

Operation

The basic HDD model includes a magnetic storage disk or hard disk that spins at a designed rotational speed. An actuator arm with a suspended slider is utilized to reach out over the disk. The slider may comprise one or more magnetic read and write transducers or heads for reading and writing information to or from a location on the disk. The slider may also comprise a heater coil designed to change shape when heat is transferred to the heater coil by means of electric current. The slider is mounted on a suspension which connects to the actuator arm. In the case of multiple platter drives, there can be multiple suspensions attaching to multiple actuator arms as components of a head stack assembly. The head stack assembly also includes a voice coil which is part of a motor used for moving the arms to a desired location on the disk(s).

Figure 1:
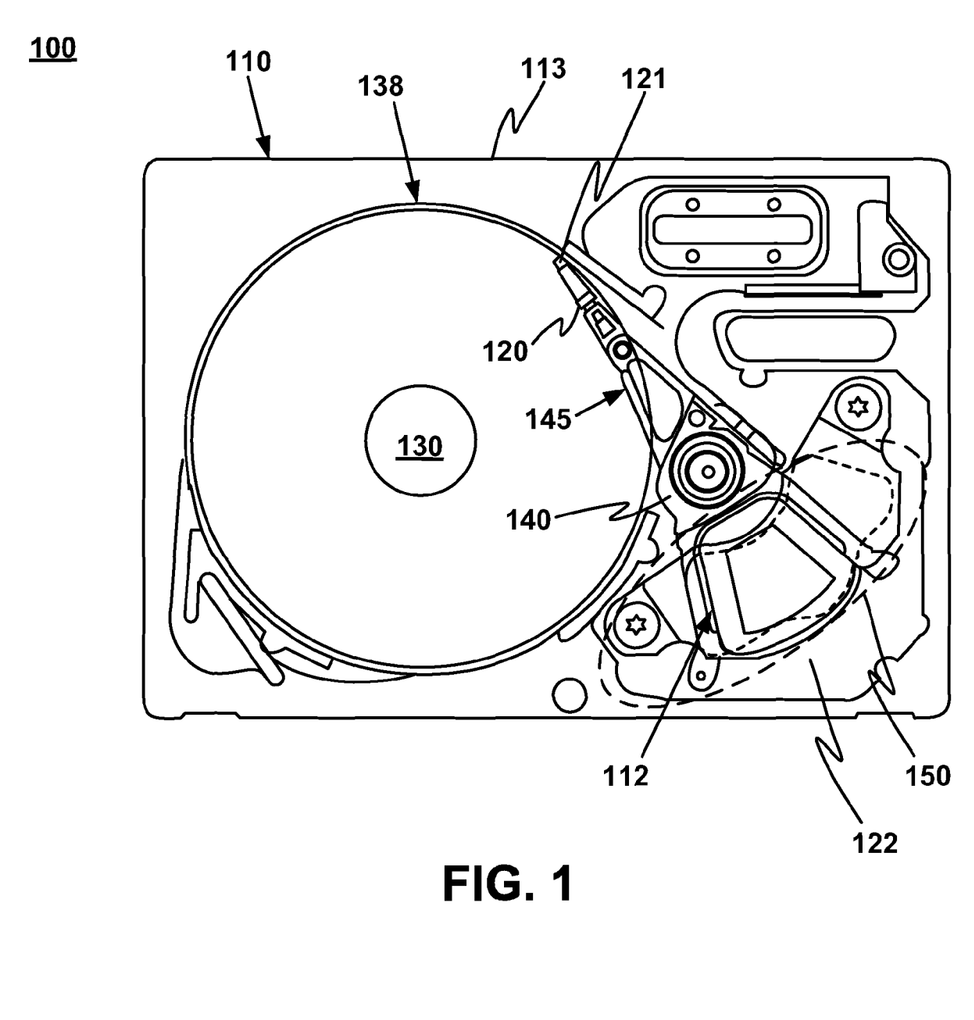
FIG. 1 is a block diagram of an HDD in accordance with embodiments of the present invention.

With reference now to FIG. 1, a schematic drawing of one embodiment of an information storage system in the form of a magnetic hard disk file or HDD 110 is shown, although only one head and one disk surface combination are shown. What is described herein for one head-disk combination is also applicable to multiple head-disk combinations. In other words, embodiments of the present technology are independent of the number of head-disk combinations. FIG. 1 represents an information storage device that is in accordance with embodiments of the present technology for measuring variations in the head-disk clearance of a HDD.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 145. When a number of actuator arms 145 are present, they are usually represented in the form of a comb that is movably or pivotally mounted to base/housing 113. An actuator arm controller 150 is also mounted to base 113 for selectively moving the actuator arms 145 relative to the disk 138. Actuator assembly 140 may be coupled with a connector assembly, such as a flex cable to convey data between arm electronics and a host system, such as a computer, wherein HDD 110 resides.

In one embodiment, each actuator arm 145 has extending from it at least one cantilevered integrated lead suspension (ILS) 120. The ILS 120 may be any form of lead suspension that can be used in a data access storage device. The level of integration containing the slider 121, ILS 120, and read and write head is called the head stack assembly.

The ILS 120 has a spring-like quality, which biases or presses the air-bearing surface of slider 121 against disk 138 to cause slider 121 to fly at a precise distance from disk 138. Slider 121 may have a pole tip which protrudes at various lengths from slider 121. Slider 121 may also contain a read head, a write head and a heater coil. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 145 opposite the head stack assemblies. Movement of the actuator assembly 140 causes the head stack assembly to move along radial arcs across tracks on the surface of disk 138. In one embodiment, actuator arm controller 150 controls a plurality of actuator arms associated with a plurality of disks.

In one embodiment, memory device 122 is capable of storing and processing electronic data that can be used in the operation of HDD 110. In one embodiment, memory device 122 comprises a storage medium such as flash memory or random access memory (RAM). Actuator arm controller 150, and other components of HDD 110, has the ability to access memory device 122 to receive information, data, instruction or commands related to its operation.

Figure 2:
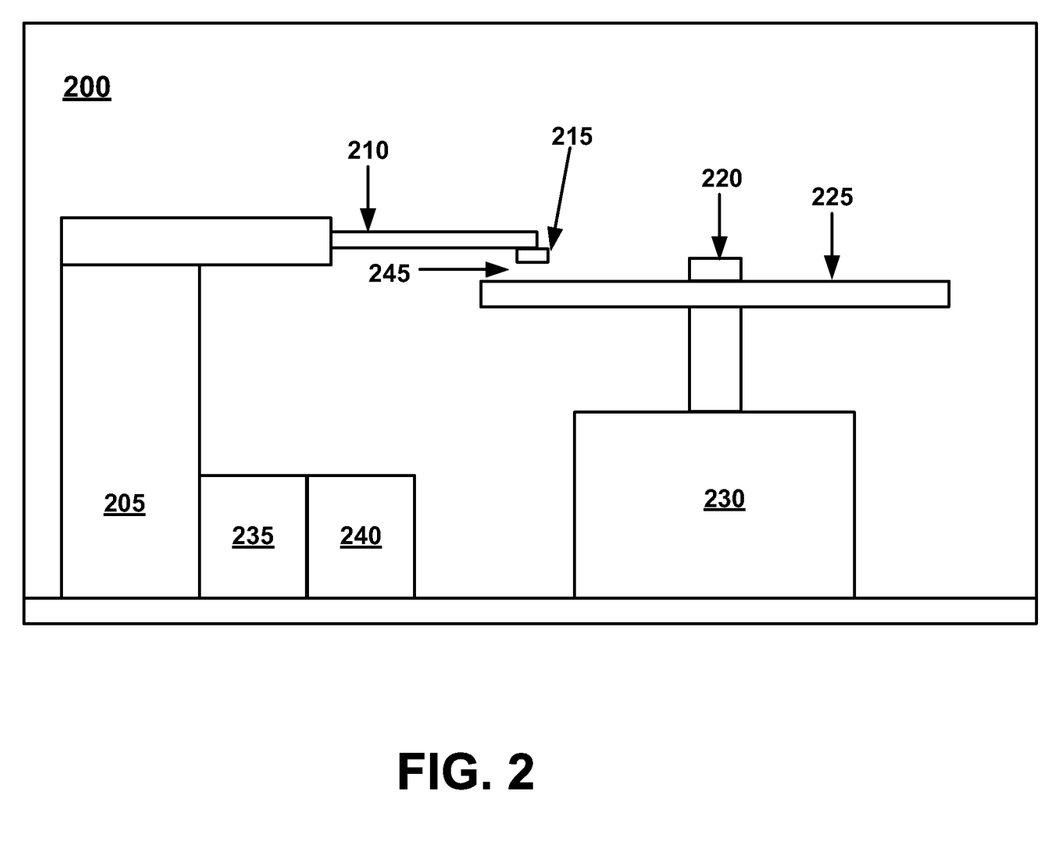
FIG. 2 is a block diagram of an HDD in accordance with embodiments of the present invention.

Reference will now be made to FIG. 2, a block diagram of a cross sectional view of one embodiment of a HDD is shown, although only one head and one disk surface combination are shown. FIG. 2 represents a HDD that may comprise some or all of the features and components of the HDD of FIG. 1. FIG. 2 depicts, HDD 200, voice coil 205, actuator arm 210, read and write head 215, spindle 220, disk 225, spindle motor 230, storage medium 235, controller 240, and clearance 245. FIG. 2 comprises components and portions of the present technology that may or may not be used with different embodiments of the present technology and should not be construed to limit the present technology.

In one embodiment, HDD 200 is the same HDD as HDD 110 of FIG. 1. In one embodiment, voice coil 205 the same as voice coil 112 of FIG. 1. In one embodiment, actuator arm 210 is one of the actuator arms represented by actuator arms 145 of FIG. 1. In one embodiment, read and write head 215 is the same as slider 121 of FIG. 1. In one embodiment, spindle 220 and spindle motor 230 are the same as central drive hub 130 of FIG. 1. In one embodiment, disk 225 is the same as disk 138 of FIG. 1. In one embodiment, storage medium 235 is the same as memory device 122 of FIG. 1.

In one embodiment, controller 240 is a hardware module that comprises various components such as actuator arm controller 150 of FIG. 1 and other components that allow controller 240 to carry out operations related to the present technology. For example, controller 240 may comprise a processor and hardware circuits that that allow it to select and process random user data, including the storage of reference points related to the random user data, and to process the data to measure variations in the head-disk clearance. A reference point may be data representing the measurement of an amplitude of a signal from the disk received by a read head reading user data written to a data sector in the disk. In one embodiment, controller 240 employs storage medium 235 to carry out the present technology. It should be appreciated that storage medium 235 may be flash memory, RAM, or other electronic memory and is a component of HDD 200. The present technology is employed to measure variations in the spacing or clearance shown as clearance 245.

Read and write head 215, in one embodiment, comprises a heater coil located between a read head and a write head. In one embodiment, read and write head 215 comprises pole tips that protrude from read and write head 215 in varying lengths. In one embodiment, the length of the protrusion varies based on how hot the pole tip is. A pole tip that has higher heat levels will expand and grow closer to disk 225. By adjusting the current applied to the heater coil, the heat level of the pole tip may be controlled. For example, if an electric current is applied to heater coil, the region around the heater thermally expands leading to reduced head-disk spacing. This is often referred to as Thermal Fly-height Control (TFC). To accurately control the head to disk clearance, one needs to calibrate the necessary power required for each head to fly at a certain spacing or clearance. Embodiments of the present technology may be used to measure variations in head-disk clearance for purposes of using TFC. A hard disk drive may have a plurality of read and write heads associated with a single disk. The present technology is able to measure variations in head-disk clearance for more than one read and write head associated with the same disk as the variations in clearance may be different for the plurality of read and write heads.

In one embodiment, the present technology does not use a dedicated track on disk 225 for measuring variations in clearance 245 between disk 225 and read and write head 215. Instead controller 240 uses data already written to at least one track of disk 225. In one embodiment, the data already written to disk 225 is user data that has been written to disk 225 during normal operations of HDD 200 by a user. Controller 240 may randomly select user data and is not required to take user data from any specific location on disk 225. For example, controller 240 may only use data from one data sector of one track of disk 225. Or controller 240 may use data from a plurality of tracks of disk 225. Controller 240 is not required to randomly select data that is consecutively written to disk 225. In one embodiment, controller 240 selects five data sectors of 512 kilo-bytes each from disk 225. With data from only five data sectors, the present technology is capable of achieving repeatability better than 0.1 nanometers. In one embodiment, controller 240 may select data from a plurality of locations on disk 225. Controller 240 may then operate to select the nearest set of user data to where a read and write operation is being performed to measure variations in the clearance.

In one embodiment, controller 240 randomly selects data from a plurality of different tracks of disk 225 and further selects data from only sector per track. Then during operation of the HDD, controller 240 determines which track read and write head 215 is operating on and uses the randomly selected data associated with that particular track to measure variations in the head disk clearance. Thus the present technology may measure variations in head-disk clearance on the fly without requiring read and write head 215 to change tracks for the variations in measurement. In one embodiment, controller 240 randomly selects data from ten different tracks of disk 225. Data selected from different tracks may be selected from different radii associated with disk 225 as the head disk clearance may vary differently at one track or radius compared to another.

In one embodiment, controller 240 stores reference points associated with the randomly selected user data in storage medium 235. A reference point may be data representing the measurement of an amplitude of a signal from the disk received by a read head reading user data written to a data sector in the disk. At a point later in time, controller 240 may then read the randomly selected user data from disk 225 again including a measurements of the amplitude of the signal from the disk received by a read head reading the same user data written to the disk. Controller 240 may then analyze the data along with the reference points to obtain a measurement in the variation of head-disk clearance. Such a variation may be obtained by analyzing the difference in signal amplitude between the reference point and the subsequent reading of the randomly selected user data. In one embodiment, such an analysis comprises taking the data waveform, and performing a Fourier Transform of it. The power spectrum may then be analyzed using a theoretical expression in order to extract spacing or clearance changes. Thus variations in head-disk clearance are measured using a spectrum of frequencies as opposed to only prior techniques which only employed two frequencies. The variations in head-disk clearance may then be employed to control the fly height of read and write head 215 over the surface of disk 225 using a technique such as TFC.

In one embodiment, the present technology analyzes the signal associated with the randomly selected user data using a Fast Fourier Transform (FFT). In one embodiment, the present technology analyzes the signal associated with the randomly selected user data using linear regression techniques. For example, the power spectrum of a signal associated with user data stored on disk 225 is not linear at high and low frequencies but may exhibit linear characteristics in a random band or range of frequencies. In one embodiment, controller 240 has the ability to discover this range of frequencies for a random set of user data and is able to use this range of frequencies within the power spectrum to perform linear regression techniques on the data in the range of frequencies to measure variations in the head-disk clearance. Such a range of frequencies may be different for two different heads operating on the same disk. In one embodiment, the range of frequencies is only discovered once for a given read and write head and may occur during calibration of the hard disk drive. The same range of frequencies is then used each time for the linear regression operation.

In one embodiment, controller 240 randomly selects a first set of user data. However, during the operation of the HDD 200, the first set of user data may be changed by the user rendering the first set of user data ineffective for measuring head-disk clearance. In such an embodiment, controller 240 may then randomly select a second set of user data and store reference points associated with the second set of user data in storage medium 235. A reference point may be data representing the measurement of an amplitude of a signal from the disk received by a read head reading user data written to a data sector in the disk. The second set of user data is then analyzed with the reference points related to the second set of user data for measuring variations in the head-disk clearance. This process may be repeated a plurality of times during the operation of HDD 200 as user data may constantly be changed.

In one embodiment, the present technology uses and captures the signal from disk 225 in a very wide range of frequencies. This is in contrast to the Wallace method which employs data from a small, discrete numbers of frequencies. The present technology may employ multiple, even several tens of thousands, data points to increase the accuracy of the variations in measurement of head-disk clearance. Furthermore, since techniques of the present technology can be used on random user data, a dedicated track on disk 225 is not required. As a result, the present technology has no measurable impact on HDD capacity or performance. In one embodiment, the present technology is employed to measure variations in head-disk clearance in real time. Real time measurements may be performed once per a second. Thus, the present technology allows for high bandwidth, real time, dynamic fly height control in HDD 200.

While FIGS. 1 and 2 only depict one disk, the present technology may be employed to measure variations in the clearance associated with a plurality of disks and their respective read and write heads in the same HDD.

Figure 3:
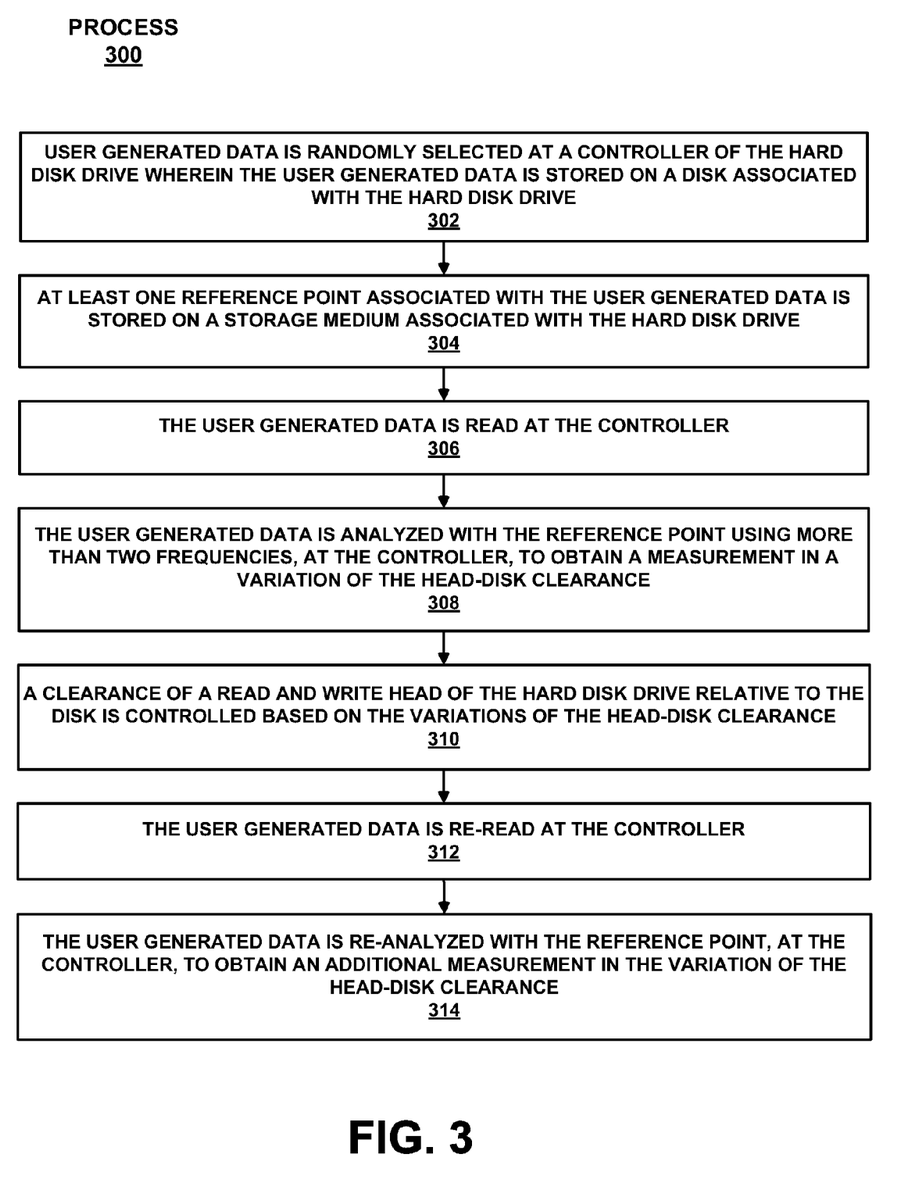
FIG. 3 is a flowchart of a method for measuring variations in head disk clearance in accordance with embodiments of the present invention.

FIG. 3 is a flowchart illustrating process 300 for measuring variations in head-disk clearance in a HDD, in accordance with one embodiment of the present technology. In one embodiment, process 300 is carried out by processors and electrical components under the control of computer readable and computer executable instructions stored on a computer-usable storage medium. In one embodiment, the computer-usable storage medium can be read by a HDD such as HDD 110 of FIG. 1 which can also execute the computer executable instructions stored on the medium. The computer readable and computer executable instructions reside, for example, in data storage features such as non-transitory computer-usable volatile and non-volatile memory. In one embodiment, process 300 is performed by HDD 110 of FIG. 1 or HDD 200 of FIG. 2. These methods, functions and other steps may be embodied as machine readable instructions stored on one or more computer readable mediums, which may be non-transitory such as hardware storage devices (e.g., RAM (random access memory), ROM (read only memory), EPROM (erasable programmable ROM), EEPROM (electrically erasable programmable ROM), hard drives, and flash memory).

At 302, user generated data is randomly selected at a controller of the hard disk drive wherein the user generated data is stored on a disk associated with the hard disk drive. In one embodiment, the controller of the HDD is controller 240 of HDD 200 of FIG. 2. In one embodiment, the user generated data is data written to disk 225. In one embodiment, the user generated data is randomly selected from only one data sector of the disk of the hard disk drive. In one embodiment, the user generated data is randomly selected from a plurality of regions of the disk, and a reference point for each of the plurality of regions of the disk is stored, and analyzing the user generated data comprises obtaining a measurement of a variation in the head-disk clearance for each of the plurality of regions of the disk.

At 304, at least one reference point associated with the user generated data is stored on a storage medium associated with the hard disk drive. In one embodiment, this is accomplished using controller 240 and storage medium 235 of FIG. 2. A reference point may be data representing the measurement of an amplitude of a signal from the disk received by a read head reading user data written to a data sector in the disk.

At 306, the user generated data is read at the controller. In one embodiment, this may simply be accessing the user generated data from storage medium 235.

At 308, the user generated data is analyzed with the at least one reference point using more than two frequencies, at the controller, to obtain a variation in a measurement of the head-disk clearance. The frequencies are related to signals received by read and write head 215 when the user data is read from disk 225. In one embodiment, the analysis uses a Fourier transform operation, linear regression or a combination of both.

At 310, a clearance of a read and write head of the hard disk drive relative to the disk is controlled based on the variation in the measurement of the head-disk clearance. Such a clearance may be clearance 245 of FIG. 2. In one embodiment, TFC techniques are employed for controlling the clearance of the read and write head.

At 312, the user generated data is re-read at the controller. At 314, the user generated data is re-analyzed with the at least one reference point, at the controller, to obtain an additional variation in the measurement of the head-disk clearance. It should be appreciated that that steps 310 and 312 illustrate that the previous steps may be repeated on a periodic basis to obtain more than one variation in the measurement of the head-disk clearance. For example, the variations in head-disk clearance may be measured in real time such as once per a second.

In one embodiment, the method further comprises identifying a range of frequencies exhibiting linear properties in a portion of a power spectrum of a signal associated with the user generated data and wherein the analyzing the user generated data with the at least one reference point uses a linear regression operation on the user generated data for a portion of data associated with the range of frequencies exhibiting said linear properties.

Figure 4:
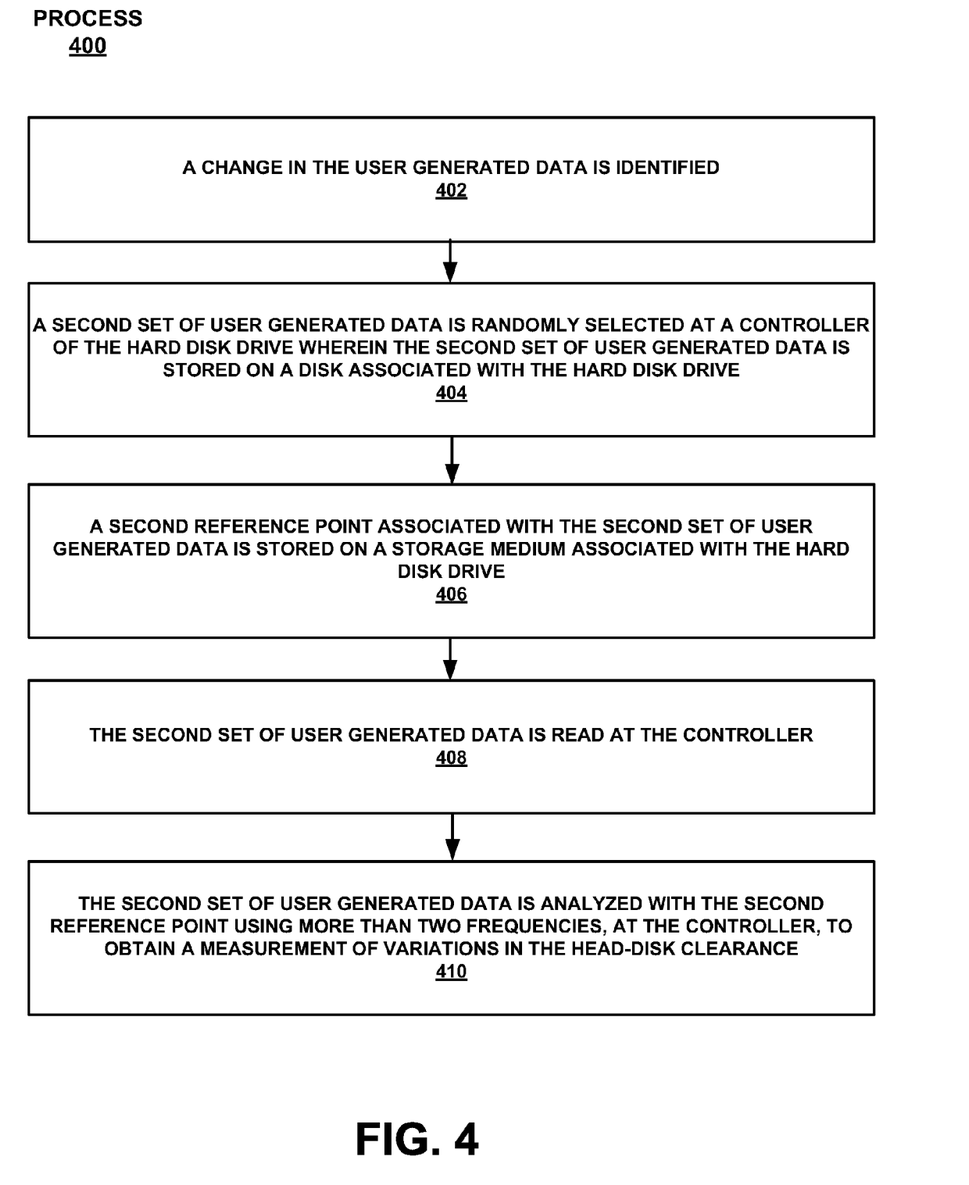
FIG. 4 is a flowchart of a method for measuring variations in head disk clearance in accordance with embodiments of the present invention.

FIG. 4 is a flowchart illustrating process 400 for measuring variations in head-disk clearance in a HDD, in accordance with one embodiment of the present technology. In one embodiment, process 400 is carried out by processors and electrical components under the control of computer readable and computer executable instructions stored on a computer-usable storage medium. The computer readable and computer executable instructions reside, for example, in data storage features such as non-transitory computer-usable volatile and non-volatile memory. In one embodiment, process 400 is performed by HDD 110 of FIG. 1 or HDD 200 of FIG. 2. These methods, functions and other steps may be embodied as machine readable instructions stored on one or more computer readable mediums, which may be non-transitory such as hardware storage devices (e.g., RAM (random access memory), ROM (read only memory), EPROM (erasable programmable ROM), EEPROM (electrically erasable programmable ROM), hard drives, and flash memory).

At 402, a change in the user generated data is identified. This may be a common occurrence during the operation of a typical HDD as a user changes, deletes and adds data to the HDD. In one embodiment, this step occurs at controller 240 of FIG. 2.

At 404, a second set of user generated data is randomly selected using more than two frequencies at a controller of the hard disk drive wherein the second set of user generated data is stored on a disk associated with the hard disk drive. The second set of user generated data may be from the same track or sector as the first set of user generated data or may be from a different track or sector.

At 406, a second reference point associated with the second set of user generated data is stored on a storage medium associated with the hard disk drive. In one embodiment, the second reference point may be stored at storage medium 235 of FIG. 2.

At 408, the second set of user generated data is read at the controller. Such as controller 240.

At 410, the second set of user generated data is analyzed with the second reference point, at the controller, to obtain a variation in measurement of the head-disk clearance. This variation in measurement of head disk clearance may be employed to control the fly height of the read and write head 215 over the surface of disk 225. In one embodiment, TFC techniques are employed for controlling the fly height.

Thus, embodiments of the present invention provide for variations in measuring head-disk clearance in a hard disk drive. It should be appreciated that the above described methods are well suited to be instructions on a computer-usable storage medium, such as a memory in a hard disk drive, that when executed cause a hard disk drive to perform methods for measuring variations in head-disk clearance in a HDD.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims. Additionally, in various embodiments of the present technology, the steps and methods described herein do not need to be carried out in the order specified, nor do all steps need to be carried out to accomplish the purposes of the technology.

What is claimed:

1. A method for measuring variations in head-disk clearance in a hard disk drive, said method comprising:
    randomly selecting user generated data at a controller of said hard disk drive wherein said user generated data is stored on a disk associated with said hard disk drive;
    storing at least one reference point associated with said user generated data on a storage medium associated with said hard disk drive;
    reading said user generated data at said controller; and
    analyzing said user generated data with said at least one reference point using more than two frequencies, at said controller, to obtain a measurement of a variation in said head-disk clearance.

2. The method of claim 1, further comprising:
    controlling a clearance of a read and write head of said hard disk drive relative to said disk based on said variation of said head-disk clearance.

3. The method of claim 1 wherein said randomly selecting said user generated data comprises randomly selecting from only one data sector of said disk of said hard disk drive.

4. The method of claim 1 wherein said randomly selecting said user generated data comprises randomly selecting data from a plurality of regions of said disk and wherein said storing comprises storing a reference point for each of said plurality of regions of said disk and said analyzing said user generated data comprises obtaining a measurement of a variation in said head-disk clearance for each of said plurality of regions of said disk.

5. The method of claim 1, further comprising:
    re-reading said user generated data at said controller; and
    re-analyzing said user generated data with said at least one reference point, at said controller, to obtain an additional variation in said measurement of said head-disk clearance.

6. The method of claim 5 wherein said re-reading said user generated data and said re-analyzing said user generated data with said at least one reference point are repeated on a periodic basis during operations of said hard disk drive.

7. The method of claim 1, further comprising:
    identifying that said user generated data has changed;
    randomly selecting a second set of user generated data at a controller of said hard disk drive wherein said second set of user generated data is stored on a disk associated with said hard disk drive;
    storing a second reference point associated with said second set of user generated data on a storage medium associated with said hard disk drive;
    reading said second set of user generated data at said controller; and
    analyzing said second set of user generated data with said second reference point using more than two frequencies, at said controller, to obtain a variation in a measurement of said head-disk clearance.

8. The method of claim 1 wherein said analyzing said user generated data with said at least one reference point uses a Fourier transform operation on said user generated data.

9. The method of claim 1, further comprising:
    identifying, at said controller, a range of frequencies exhibiting linear properties in a portion of a power spectrum of a signal associated with said user generated data; and
    wherein said analyzing said user generated data with said at least one reference point uses a linear regression operation on said user generated data for a portion of data associated with said range of frequencies exhibiting said linear properties.

10. A non-transitory computer-usable storage medium having instructions embodied therein that when executed cause a computer system to perform a method for measuring variations in head-disk clearance in a hard disk drive, said method comprising:
    randomly selecting user generated data at a controller of said hard disk drive wherein said user generated data is stored on a disk associated with said hard disk drive;
    storing a reference point associated with said user generated data on a storage medium associated with said hard disk drive;
    reading said user generated data at said controller; and
    analyzing said user generated data with said reference point using more than two frequencies, at said controller, to obtain a measurement of a variation in said head-disk clearance.

11. The non-transitory computer-usable storage medium of claim 10, further comprising:
    controlling a clearance of a read and write head of said hard disk drive relative to said disk based on said variation of said head-disk clearance.

12. The non-transitory computer-usable storage medium of claim 10, further comprising:
    re-reading said user generated data at said controller; and
    re-analyzing said user generated data with said reference point, at said controller, to obtain an additional variations in said measurement of said head-disk clearance.

13. The non-transitory computer-usable storage medium of claim 12 wherein said re-reading said user generated data and said re-analyzing said user generated data with said reference point are repeated on a periodic basis during operations of said hard disk drive.

14. The non-transitory computer-usable storage medium of claim 10, further comprising:
    identifying that said user generated data has changed;

randomly selecting a second set of user generated data at a controller of said hard disk drive wherein said second set of user generated data is stored on a disk associated with said hard disk drive;

storing a second reference point associated with said second set of user generated data on a storage medium associated with said hard disk drive;

reading said second set of user generated data at said controller; and analyzing said second set of user generated data with said second reference point using more than two frequencies, at said controller, to obtain a variation is a measurement of said head-disk clearance.

15. The non-transitory computer-usable storage medium of claim 10 wherein said analyzing said user generated data with said reference point uses a Fourier transform operation on said user generated data.

16. The non-transitory computer-usable storage medium of claim 10, further comprising:

identifying, at said controller, a range of frequencies exhibiting linear properties in a portion of a power spectrum of a signal associated with said user generated data; and wherein said analyzing said user generated data with said reference point uses a linear regression operation on said user generated data for a portion of data associated with said range of frequencies exhibiting said linear properties.

17. A disk drive system comprising:

at least one magnetic disk with user generated data stored on said at least one magnetic disk;

a read and write head configured to read and write data on said at least one magnetic disk and to fly over said at least one magnetic disk with a clearance;

a controller configured to randomly select a set of user generated data from said user generated data stored on said at least one magnetic disk, store a reference point associated with said set of user generated data, read said set of user generated data, and analyze said set of user generated data with said reference point to obtain a variation in a measurement of said clearance of said read and write head over said at least one magnetic disk.

18. The disk drive system of claim 17 wherein said controller is further configured to control said clearance of said read and write head based on said variations in measurement of said clearance.

19. The disk drive system of claim 17, further comprising:

a plurality of read and write heads associated with said at least one magnetic disk configured to read and write data on said at least one magnetic disk and to fly over said at least one magnetic disk each with a different clearance; and said controller configured to randomly select a plurality set of user generated data from said user generated data stored on said at least one magnetic disk for each of said plurality of read and write head, store a reference point associated with each of said sets of user generated data, read each of said sets of user generated data, and analyze each of said sets of user generated data with said references point to obtain a variation in a measurement of each of said clearances of each of said plurality of read and write heads over said at least one magnetic disk.

20. The disk drive system of claim 17 wherein said controller is further configured to use a Fourier transform operation to obtain said variations in measurement of said clearance of said read and write head over said at least one magnetic disk.

* * * * *